US009746665B1

(12) United States Patent
Quakenbush

(10) Patent No.: US 9,746,665 B1
(45) Date of Patent: Aug. 29, 2017

(54) HIGH ACCELERATION ACTUATOR

(71) Applicant: Ball Aerospace & Technologies Corp., Boulder, CO (US)

(72) Inventor: Timothy K. Quakenbush, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 15/145,151

(22) Filed: May 3, 2016

Related U.S. Application Data

(62) Division of application No. 14/321,164, filed on Jul. 1, 2014, now Pat. No. 9,354,422.

(Continued)

(51) Int. Cl.
| | | |
|---|---|---|
| G02B 7/182 | (2006.01) | |
| G02B 26/10 | (2006.01) | |
| H02K 1/14 | (2006.01) | |
| G02B 26/08 | (2006.01) | |
| H02K 16/04 | (2006.01) | |
| H02K 41/035 | (2006.01) | |

(52) U.S. Cl.
CPC ....... *G02B 26/0816* (2013.01); *G02B 7/1821* (2013.01); *G02B 26/10* (2013.01); *H02K 16/04* (2013.01); *H02K 1/141* (2013.01); *H02K 1/148* (2013.01); *H02K 41/035* (2013.01); *H02K 2201/18* (2013.01)

(58) Field of Classification Search
CPC .... H02K 1/148; H02K 2201/18; H02K 16/04; G02B 26/10; G02B 7/1821
USPC ...................... 74/5.7, 5.37; 396/13; 359/877; 310/12.05, 12.13, 12.15
See application file for complete search history.

(56) References Cited

U.S. PATENT DOCUMENTS 4,443,743 A * 4/1984 Forys ................. H02K 41/0354
310/12.04
4,828,376 A * 5/1989 Padera ....................... F41G 3/22
269/75

(Continued)

FOREIGN PATENT DOCUMENTS

| JP | 2001-264663 | * | 9/2001 | ............. G02B 26/10 |
| JP | 2002-319504 | * | 10/2002 | ............. H01F 7/16 |
| WO | WO 9966624 A1 | * | 12/1999 | ............. H02K 1/141 |

OTHER PUBLICATIONS

J-Plat Pat English Machine Translation JP-2001-264663, Kai et al., Sep. 2001.*

(Continued)

*Primary Examiner* — Burton Mullins
(74) *Attorney, Agent, or Firm* — Sheridan Ross P.C.

(57) ABSTRACT

Embodiments of the present disclosure include an actuator for steering mirrors with low magnetic hysteresis losses at high frequencies, with a fast step response, and without excessive heating of the steering mirror. Various embodiments of the actuator include two stators (a left stator and a right stator or an inner stator and an outer stator) and a rotor positioned between the stators. Each stator has a core assembly with one or more cores, two or more legs, and two or more faces positioned proximate to the rotor. The two or more legs are separated from one another by portions of the one or more coils. The rotor includes a core and a plurality of magnets, where each magnet has a face positioned proximate to the faces of one core assembly.

9 Claims, 11 Drawing Sheets

Related U.S. Application Data

(60) Provisional application No. 61/841,487, filed on Jul. 1, 2013.

(56) References Cited

U.S. PATENT DOCUMENTS

| | | | | |
|---|---|---|---|---|
| 5,550,669 A * | 8/1996 | Patel | ................ | G02B 7/1821 |
| | | | | 248/485 |
| 5,808,395 A * | 9/1998 | Anders | ................ | H02K 16/04 |
| | | | | 310/266 |
| 6,144,118 A * | 11/2000 | Cahill | ................ | H02K 41/031 |
| | | | | 310/12.06 |
| 6,700,230 B1 * | 3/2004 | Gokturk | ................ | H02K 33/16 |
| | | | | 310/12.15 |
| 6,856,437 B2 * | 2/2005 | Witt | ................ | G02B 7/1821 |
| | | | | 248/477 |
| 7,193,339 B2 * | 3/2007 | Uchida | ................ | B82Y 10/00 |
| | | | | 310/12.19 |
| 7,399,096 B1 * | 7/2008 | Lorell | ................ | G02B 7/1821 |
| | | | | 359/202.1 |
| 7,671,711 B2 * | 3/2010 | Suzuki | ................ | H02K 41/03 |
| | | | | 200/330 |
| 7,686,597 B2 * | 3/2010 | Ries | ................ | H02K 1/28 |
| | | | | 310/15 |
| 7,712,982 B2 * | 5/2010 | Akiba | ................ | G03B 17/00 |
| | | | | 310/156.38 |
| 7,989,991 B2 * | 8/2011 | Gruendl | ................ | F01L 9/04 |
| | | | | 310/12.04 |
| 8,466,587 B2 * | 6/2013 | Aoyama | ................ | H02K 41/031 |
| | | | | 310/12.24 |
| 8,752,969 B1 * | 6/2014 | Kane | ................ | G02B 7/1821 |
| | | | | 356/139.05 |
| 2012/0212723 A1 * | 8/2012 | Hol | ................ | H01F 7/081 |
| | | | | 355/67 |

OTHER PUBLICATIONS

J-Plat Pat English Machine Translation JP-2002-319504, Tanigawa et al., Oct. 2002.*

* cited by examiner

HIGH ACCELERATION ACTUATOR

CROSS-REFERENCE TO RELATED APPLICATIONS

This application is a divisional of U.S. patent application Ser. No. 14/321,164, filed Jul. 1, 2014, which claims the benefit of U.S. Provisional Patent Application Ser. No. 61/841,487, filed Jul. 1, 2013, the entire disclosures of which are hereby incorporated herein by reference.

FIELD

The present disclosure provides a high acceleration actuator. More particularly, an actuator for steering mirrors is provided.

BACKGROUND

Fast steering mirrors ("FSMs") have become key components in diverse applications spanning from high value space assets to tactical military hardware and industrial instrumentation. FSMs range in size from a few millimeters to a half meter and typically only move 2-3° in any direction. An FSM can be used to perform a variety of functions including tracking, scanning, pointing, line of sight stabilization, and alignment. FSMs are used for image motion control to stare at a scene while the platform moves and then rapidly reposition the line of sight during the focal plane readout period. In an image motion control application, the FSM will be operable to continuously correct for environmental disturbances such as air turbulence or vehicle vibrations. FSMs are also used in laser pointing applications, which require accurately controlled point-to-point movements. FSMs are often a part of space telescopes. FSMs are also a key component of military aircraft infrared countermeasure pods used to protect aircraft from missile attacks during takeoff and landing.

Traditional steering mirrors, specifically FSMs, include four voice coil actuators to provide fast, high-bandwidth movement. Utilized in push-pull pairs, the actuators provide smooth, even torque to the mirror. Current is provided to the voice coils to tip and tilt the mirror assembly. An internal electromagnetic or optical-based feedback loop is built into the FSM head (one or more sensor pairs per rotation axis) to provide position feedback with reference to the support frame for accurate and stable pointing and tracking. However, the sensors often have electric fields that can be affected by the actuator magnetic flux causing interference to the measured angles.

Typically, steering mirror actuators use a coil of wire attached to the steering mirror base, and a magnet attached to the moving mirror. Some geometry of soft magnetic material is attached to the magnet to direct the magnetic flux perpendicular to the coil walls so that the Lorentz force equation (F=I*B) can be used to estimate the force. The result for a typical voice coil type actuator is a large path length through air for the magnetic flux which reduces the magnetic flux density as described by Gauss' law for magnetism applied to the surfaces of the magnet. Very small air gap path lengths, and much larger flux densities, are possible by using soft magnetic materials to direct the magnetic flux from the magnet faces through the center of wire coils. The commonly used materials are typically lousy with the rapidly changing flux density that are necessary to achieve fast response times, which can lead to excessive phase loss for a stable control system and compounds problems with actuator heat.

Over the years, steering mirrors have improved due to advances in the optics, the actuators that move the mirror, the feedback sensors that determine mirror position, and the control system that ties everything together. However, existing FSMs have reached an upper limit of fast step response without producing a lot of excess heat due to the rapidly changing flux density. The excess heat requires additional mass and volume for thermal management and can distort components reducing the accuracy of the steering mirror. Additionally, alternative actuators, such as stepper or brushless servo motors (linear and rotary), are too large for application with FSMs and suffer from the same limitations described above.

SUMMARY

There is a need for steering mirrors with lower magnetic hysteresis losses at high frequencies, faster step response, and without excessive heating of the steering mirror than is possible with voice coil actuators. Embodiments of this disclosure can reduce the step response time of a FSM by a factor of two through an innovation focused on improving the force per current of the actuators, without increasing the inertia of the moving actuator parts. Additionally, having the magnetic flux contained within a smaller space than existing voice coil actuator reduces the magnetic interference into the sensors and feedback-loop. Note that the actuator may also be called a motor herein.

Conventional steering mirror actuators use a coil of wire attached to the steering mirror base and a magnet attached to the moving mirror. Soft magnetic material is attached to the magnet to direct the magnetic flux through the coil walls so that the Lorentz force equation (F=I*B) can be used to estimate the force. The result is a large path length (greater than 0.1 inch) through air for the magnetic flux. In a traditional voice coil, an armature made of soft magnetic material surrounds the magnet to direct the magnetic flux and the path length is the distance along magnetic flux lines between the armature end surfaces and the magnet. Maxwell's equations applied to the closed loop flux path predict that reducing the air gap path length to about 0.02 inch, for the same magnet face area, will roughly double the magnetic flux density. This is a common magnetic design approach for rotating actuators with permanent magnets: maximize the ratio of (magnet face area)/(flux air gap length). Thus, resultant force can be increased by increasing the magnetic flux density, increasing the face area, or reducing the air gap length. Embodiments of the present disclosure focus on increasing the magnetic flux density such that the parts' sizes do not have to be increased.

One aspect of embodiments of this innovation is to provide a steering mirror with two times larger force per current without increasing the inertia of the moving actuator parts. This can be accomplished by providing a symmetrical drive configuration with close tolerances and by adding low loss ferromagnetic materials (i.e., nanocrystalline or amorphous magnetic alloy tapes) to reduce the flux-air volume and magnet mass for the same force. It is another aspect of embodiments of the present disclosure to provide steering mirror actuators with improved force per current. Note that the term nanocrystalline in this disclosure includes magnetic amorphous alloys and any material with magnetic saturation above flux density of rare earth magnets (about 1.2 Tesla) and that exhibits less than about 10 degrees of phase loss between internal material magnetization and externally applied magnetic field with modulation frequency in the range of zero to 100 kHz.

Various embodiments of the present disclosure include a steering mirror system comprising a mirror, a base, at least one actuator interconnected to the base and mirror. The actuator includes an inner stator, an outer stator, and a rotor with a rotor core and a plurality of magnet. Each stator comprises a core assembly and at least one coil. Note that the rotor may also be called a "rotor structure" or a "rotor assembly" herein.

Embodiments of the present disclosure can include a stator assembly with a core assembly having at least two legs and at least two faces provided the rotor has a different number of magnet faces (i.e., three stator core assembly faces with two rotor magnet faces or two stator core assembly faces with three rotor magnet faces). The core assembly can include multiple core elements. Each core element can provide at least a portion of each face. Moreover, each core element can be a laminated structure with layers that are stacked in a dimension that is generally perpendicular to an axis of a curve formed between the two faces of which the core element forms at least a portion. Layers are aligned parallel to the magnetic flux path through the majority of the core elements. In accordance with still other embodiments, each core assembly is associated with at least one coil that is positioned around at least one leg of the core assembly.

Various embodiments of the present disclosure include an actuator comprising a rotor structure with a rotor core and a plurality of magnets, a first stator with a first core assembly and at least one coil, and a second stator with a second core assembly and at least one coil. The first core assembly can include (1) a first laminated core element, which has a first face portion and a third face portion, where the first face portion and the third face portion of the first laminated core element are adjacent a first side of the rotor structure; (2) a second laminated core element, which has a first face portion and a second face portion, where the first face portion and the second face portion of the second laminated core element are adjacent the first side of the rotor structure; and (3) a third laminated core element, which has a second face portion and a third face portion, where the second face portion and the third face portion of the third laminated core element are adjacent the first side of the rotor structure. Additionally, the first face portion of the first laminated core element can be adjacent to the first face portion of the second laminated core element to form a first face of the first core assembly. Further, the third face portion of the first laminated core element can be adjacent to the third face portion of the third laminated core element to form a third face of the first core assembly and the second face portion of the second laminated core element can adjacent to the second face portion of the third laminated core element to form a second face of the first core assembly. The second core assembly can include three laminated core elements each with two face portions such that one face portion from one core element and one face portion from another core element form a first face of the second core assembly, two other face portions (each from a different core element) form a second face of the second core assembly, and two other face portions (each from a different core element) form a third face of the second core assembly. In further embodiments of the present disclosure, the first stator further comprises a coil element positioned around a first leg of the first core assembly and proximate to the face portions of each of the first, second, and third laminated core elements of the first core assembly, and the second stator further comprises a second coil element positioned around a first leg of the second core assembly and proximate to the face portions of each of the first, second, and third laminated core elements of the second core assembly.

One embodiment of the present disclosure includes a steering mirror system comprising a mirror, a base, and an actuator interconnected to the base and the mirror. The actuator can include a rotor with a rotor core, a first magnet on a first side of the rotor core, and a second magnet on a second side of the rotor core; a first stator positioned proximate to the first side of the rotor and having a first core assembly, a first leg, and a first coil extending around the first leg; and a second stator positioned proximate to the second side of the rotor and having a second core assembly, a second leg, and a second coil extending around the second leg. The first core assembly can include a first core and a first face at the end of the first leg and positioned adjacent to the first magnet of the rotor, such that there is a first space between the first magnet and the first face. The second core assembly can include a second core and a second face at the end of the second leg and positioned adjacent to the second magnet of the rotor, such that there is a second space between the second magnet and the second face. Further, the second stator is diametrically opposed to the first stator. In some embodiments, the first core assembly of the first stator further includes a third face and a fifth face adjacent the first side of the rotor, and the second core assembly of the second stator includes a fourth face and a sixth face adjacent the second side of the rotor. In still further embodiments, the rotor includes a third magnet on the first side of the rotor and a fourth magnet on the second side of the rotor. The steering mirror system can also include a gimbal assembly interconnected at a first end to the mirror and at a second end to the base.

Embodiments of the present disclosure use nanocrystalline magnetic tapes instead of the typical silicon steel or cobalt iron alloys as the soft magnetic material to direct the magnetic flux through the coils because of nanocrystalline magnetic tapes' low phase and power loss at high frequencies. Additionally, embodiments of the stator cores using nanocrystalline magnetic materials accommodate the slight reduction of field density saturation compared to typical soft magnetic materials.

DETAILED DESCRIPTION

FIGS. 1-9D show actuators with two stators (a left stator and a right stator or an inner stator and an outer stator) and a rotor positioned between the stators. Note that the stator may also be called a stator assembly herein and the rotor may be called a rotor assembly herein. In some embodiments (e.g., as shown in FIGS. 1-2 and 5-6), each stator assembly includes a stator core assembly and one coil. In other embodiments (FIGS. 3-4 and 7-9), each stator assembly includes a stator core assembly and two coils. The stator core assembly comprises two or more cores, and specifically includes three cores in some embodiments, where each core is made of a material with a high saturation flux density and low magnetic hysteresis loss in high frequency, high flux density conditions. For purposes of the present disclosure, a high frequency is at least 10 kHz, a high flux density is at least 0.5 T, and a low loss is less than 5 W/lb of material at 10 kHz and 0.5 T peak to peak. Preferred core materials for embodiments of the present disclosure include any material with low loss at high frequency and flux density, which includes some amorphous and crystalline metal tape alloys with iron grain size less than 20 nanometers.

Figure 1:
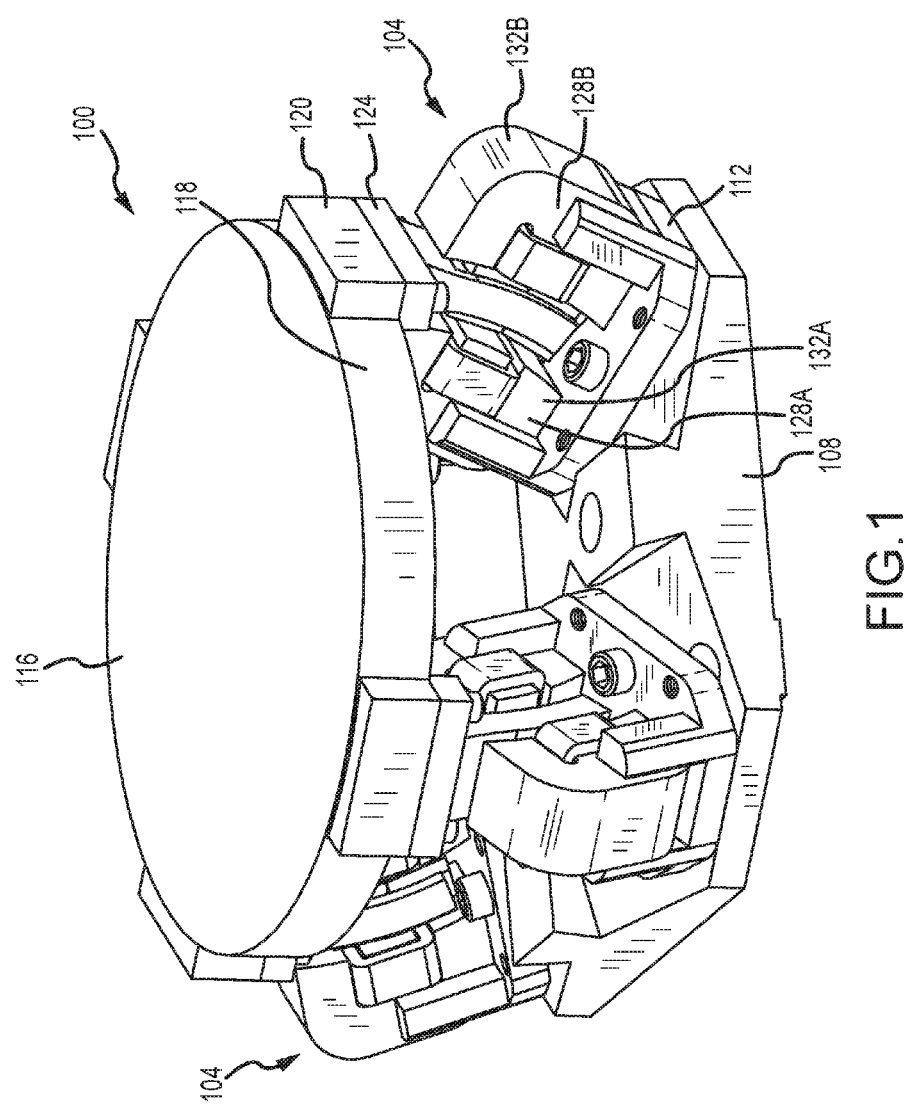
FIG. 1 is a perspective view of one embodiment of a steering mirror assembly with four actuators.

FIG. 1 is a perspective view of one embodiment of a steering mirror assembly 100 comprising four actuators 104, four actuator bases 112, an assembly base 108, and a mirror 116. The actuators 104 are interconnected to the actuator bases 112, which are in turn interconnected to the assembly base 108. Further, the actuator bases 112 may comprise posts to further constrain and secure the stators 128A, 128B.

The mirror 116 can comprise a support structure 118 with a mounting lug 120 for each actuator 104 (i.e., four mounting lugs 120 in the embodiment of FIG. 1), such that each actuator 104 can push or pull on an associated mounting lug 120. The mirror 116 can be made from a material and design, such as carbon fiber reinforced polymer, to prevent resonant vibration modes that would interfere with a high bandwidth control system consistent with fast step response. Additionally, the actuator 104 may comprise a magnet bracket 124 that interconnects to the mirror 116 or, more specifically, interconnects to the mounting lug 120.

The magnet bracket 124 can include a portion that extends downwardly around the rotor assembly. The magnet bracket 124 may even include two portions that extend downwardly, one on one side of the rotor and the other on the other side of the rotor. The magnet bracket 124 is typically comprised of aluminum or fiber reinforced polymer (i.e., light weight, non-magnetic material). Further, portions of the magnet bracket 124 can be different materials selected for different magnetic properties and the magnet bracket 124 may be a different material with different magnetic properties than the rotor core. Alternatively, the mirror 116 can interconnect to the actuator 104 in any way known in the art.

The actuators 104 each comprise two stators (an inner stator 128A and an outer stator 128B) and each stator 128A, 128B includes a stator core assembly 132A, 132B. Further, the actuators 104 of FIG. 1 only have one coil per stator 128A, 128B in order to use the actuators 104 with only a single-axis force (e.g., vertical rotor force). In such an embodiment the lateral mirror motion can be constrained by a flexure or bearings 200 (shown in FIG. 2). Tilting the mirror 116 is accomplished by driving opposing actuators 104 with opposite currents so that one actuator 104 pulls and the other actuator 104 pushes on the support structure 118 of the steering mirror assembly 100, e.g., through a pair of the mirror mounting lugs 120.

Figure 3:
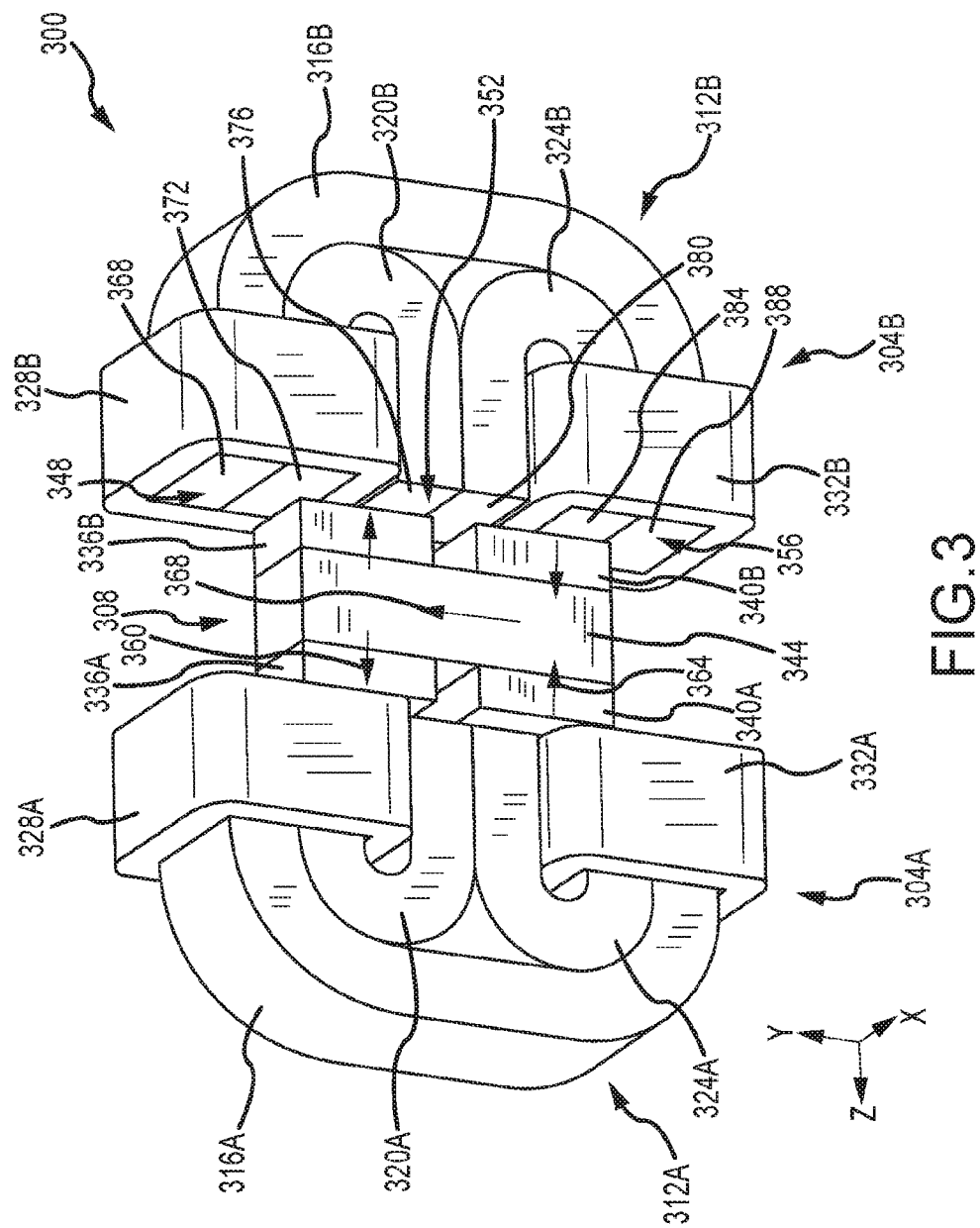
FIG. 3 is a perspective view of one embodiment of an actuator.
Figure 5:
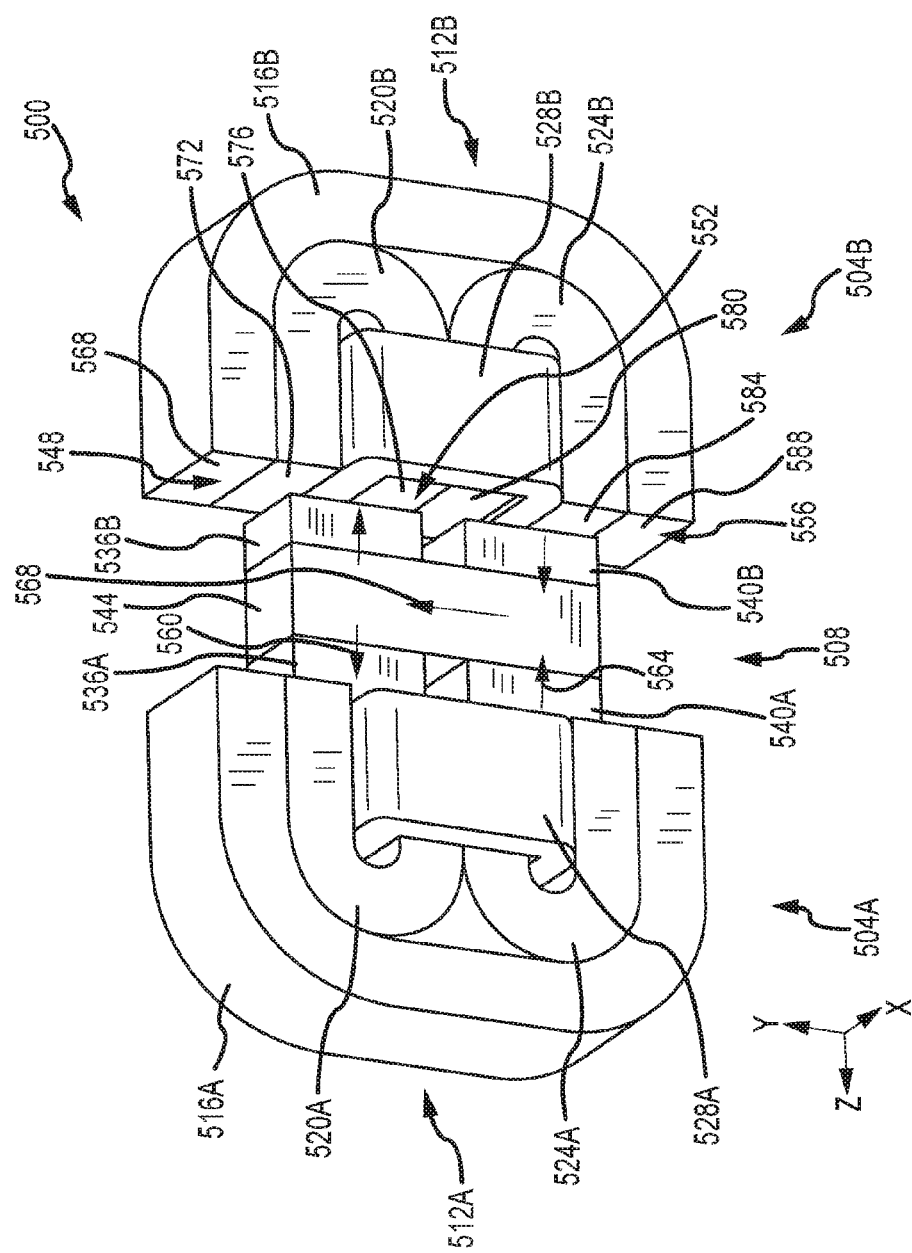
FIG. 5 is a perspective view of another embodiment of an actuator.

The core assemblies 132A, 132B can each include three legs and a face at the end of each leg, as more thoroughly described in accordance with FIGS. 3 and 5. Note that the terms "leg" and "tooth" may be used interchangeably herein when referring to a portion of the core assembly 132A, 132B that generally extends between or connects a curved portion to a free portion of a core. The core assemblies 132A, 132B may have more or fewer than three faces, provided the number of core assembly faces is not equal to the number of mating magnet faces on the rotor such that the actuator force is monotonic through the range of motion of the rotor. For example, the actuator can include two inner stator core assembly faces, two outer stator core assembly faces, and a rotor that has three magnet faces on each side of the rotor. However, such a configuration may be more difficult to construct than the illustrated embodiments. An actuator plane can be defined such that the actuator plane splits the actuator 104 into two halves with one half including the inner stator 128A and one half including the outer stator 128B. The actuator plane is thus oriented in a vertical direction relative to the stators 128A, 128B and orthogonal to the upper surfaces of the core assemblies 132A, 132B.

Figure 4:
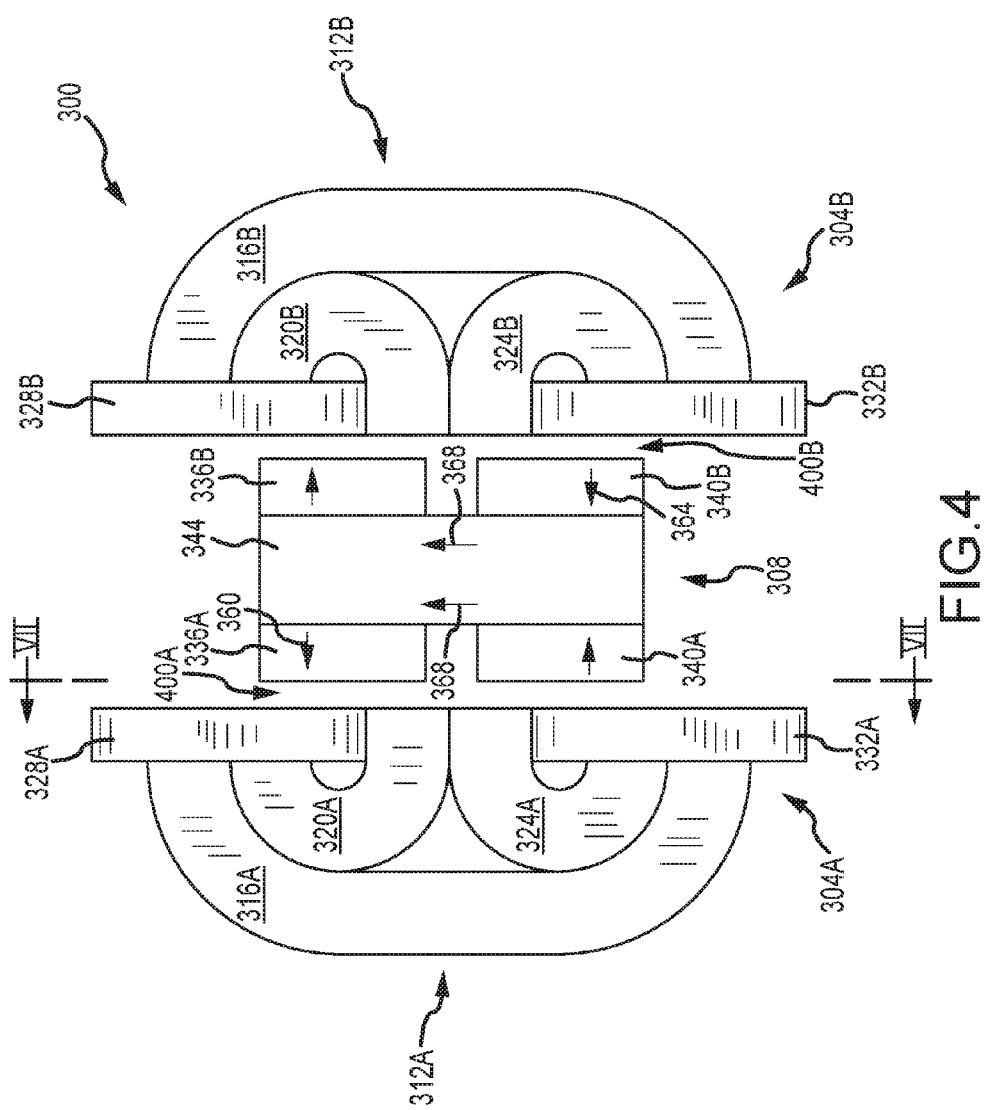
FIG. 4 is a top plan view of the actuator of FIG. 3.
Figure 6:
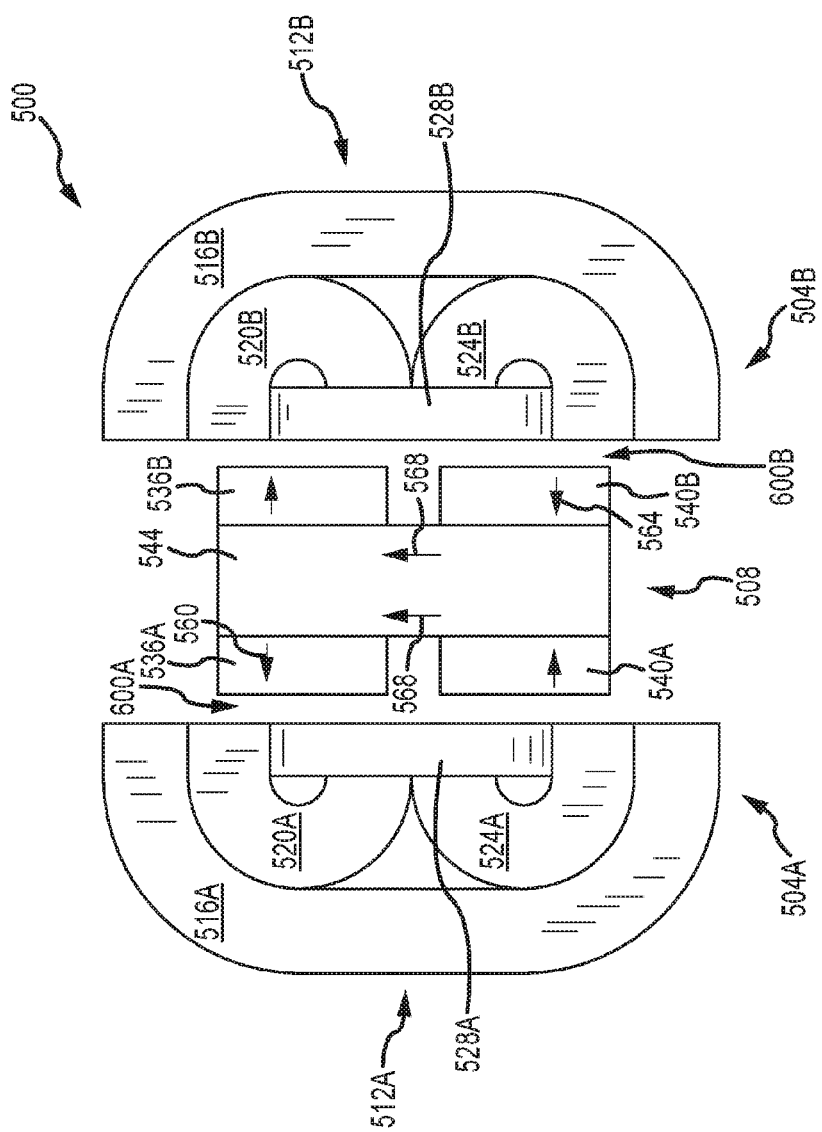
FIG. 6 is a top plan view of the actuator of FIG. 5.

In the exemplary embodiment depicted in FIG. 1, the rotor may be curved or angled such that the rotor's curve or angle generally follows the radius of the mirror 116 motion. In one embodiment, the inner surface of the rotor core is concave relative to the actuator plane and the outer surface of the rotor core is convex relative to the actuator plane. Further, the inner surface of the rotor core can be concave with respect to a line that passes through the faces of the core assembly 132A of the inner stator 128A and the outer surface of the rotor core can be convex with respect to a line that passes through the faces of the core assembly 132B of the outer stator 128B. The faces of the core assembly 132A of the inner stator 128A may be convex relative to the actuator plane or the faces may curve, slant, or angle inward away from the actuator plane. Thus, the radius or angle of the faces is complementary to the curved inner surface of the rotor in order to keep the gap between the inner stator 128A and the rotor consistent. Further, the faces (not shown) of the core assembly 132B of the outer stator 128B may be concave relative to the actuator plane or the faces may curve, slant, or angle inward toward the actuator plane. Thus, the radius or angle of the faces is complementary to the curved outer surface of the rotor in order to keep the gap between the outer stator 128B and the rotor consistent. The faces of any one core assembly 132A, 132B can alternatively fall within a common plane, as shown in FIGS. 4 and 6.

The assembly base 108 may be metal, plastic, ceramic, or any other material used in the art. The actuator base 112 may be the same material as the assembly base 108 or may be a different material and may be metal, plastic, ceramic, or any other material used in the art. The assembly base 108 may include slanted portions such that the actuator base(s) 112 and the actuator(s) 104 are angled away from the mirror 116, i.e., the upper surface of the outer stator 128B is further below the bottom surface of the mirror 116 than the upper surface of the inner stator 128A. Such positioning of the actuators 104 can facilitate movement of the mirror 116 about a mirror center point.

Each actuator base 112 can include one or more apertures for one or more terminals, which are typically insulated. In one embodiment, each actuator base 112 includes four insulated terminals to connect the coils to power supplies. The steering mirror assembly 100 may further comprise sensors (not shown) to determine the displacement or angle of the mirror 116 and a control loop may be implemented by a controller or processor to correct and adjust the mirror 116 position in response to signals from the sensors. Various types of securing means, such as bolts, screws, pins, adhesives, etc., may be used in various embodiments to interconnect the various components of the mirror assembly 100.

An air gap (400A, 600A in FIGS. 4 and 6) between the inner stator 128A and the rotor and an air gap (400B, 600B in FIGS. 4 and 6) between the outer stator 128B and the rotor can be seen in FIG. 1. In some embodiments, one air gap (i.e., the air gap between the core assembly 132A with convex faces) is bigger than the second gap (i.e., the air gap between the core assembly 132B with concave faces) if the faces are different sizes. If the face size (surface area) of one stator 128A is different than the face size (surface area) of the other stator 128B, then the air gaps should be different sizes in order to equalize the forces applied by the stators 128A, 128B because the face size and the air gap size are both proportional to the force.

Figure 2:
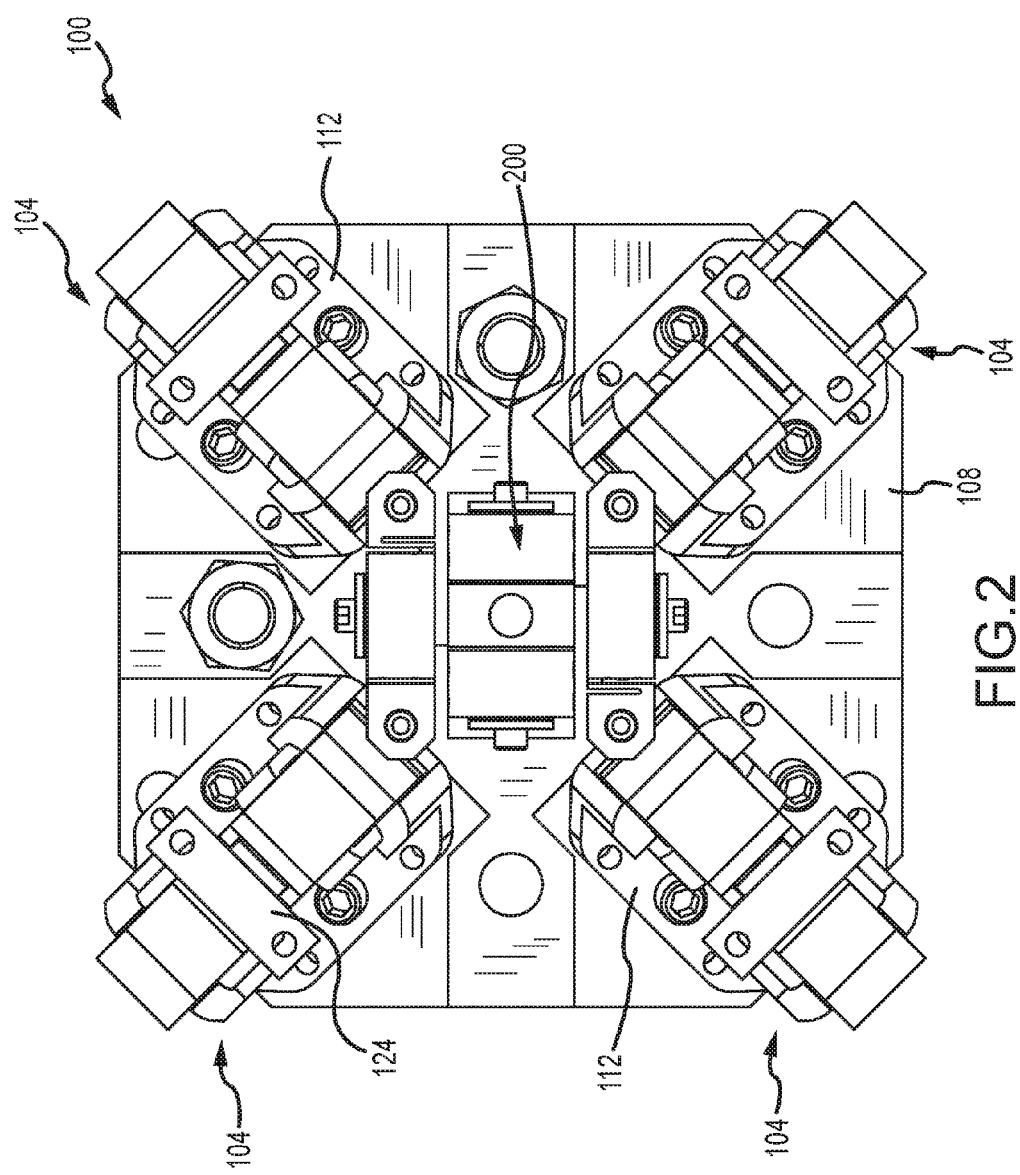
FIG. 2 is a top plan view of the steering mirror assembly of FIG. 1 with the mirror removed.

FIG. 2 is a top plan view of the steering mirror assembly 100 of FIG. 1 with the mirror removed for clarity such that the gimbal assembly 200 can be seen. The actuators 104 are positioned at approximately 90° intervals about the gimbal assembly 200. Each actuator base 112 is positioned below its respective actuator 104 and is substantially in line with its actuator 104. FIG. 2 further shows the upper surface of the magnet bracket 124, which may be flat as shown or may have grooves, bumps, protuberances, a pad/cushion, or other surface features to interconnect to an associated mirror mounting lug 120.

The gimbal assembly 200 is located at or near the center of the mirror 116 and/or at or near the center of the assembly base 108, and is positioned between the mirror and assembly base 108. The gimbal assembly 200 includes bearings (or sets of bearings) to allow movement of the mirror around two axes, one or more (preferably two) mirror clevises interconnected to the mirror structure 118, and one or more (preferably two) base devises interconnected to the assembly base 108. Different gimbal assemblies 200 can be used in different embodiments. In one embodiment, the gimbal assembly 200 comprises gimbal U-joint bearings. In some embodiments the steering mirror assembly 100 does not include a gimbal assembly and rather includes a flexure, rails, tracks, springs, etc. for constraining the mirror around one axis and for allowing the mirror to move around two axes. In at least one embodiment, the steering mirror assembly 100 includes a unique flexure suspension that avoids transferring the forces of dissimilar metal expansion to the mirror surface. A non-contacting sensor system measures mirror angular displacement providing a highly linear relationship between the geometrical displacement and sensor signal. A standard digital controller is configurable to an FSM, gimbals, and the specific mission.

FIG. 3 is a perspective view of one embodiment of an actuator 300. FIG. 4 is a top plan view of the actuator of FIG. 3. The actuator 300 includes a left stator 304A, a right stator 304B, and a rotor assembly 308. The rotor assembly 308 in FIG. 3 includes four permanent magnets 336A, 336B, 340A, 340B interconnected to a rotor core 344. In this exemplary embodiment, two magnets are located on each side of the rotor core 344 (i.e., left side and right side): upper left magnet 336A, lower left magnet 340A, upper right magnet 336B, and lower right magnet 340B. The magnets are also positioned opposite one another such that the upper right magnet 336B is opposite the upper left magnet 336A. The same is true for the lower magnets 340A, 340B. Further, the magnets 336A, 336B, 340A, 340B have consistent geometries and are symmetrical around the rotor core 344 to balance or cancel the horizontal force onto the rotor assembly 308.

The magnetizations of the magnets 336A, 336B, 340A, 340B are oriented to create a closed loop flux path from a magnet 340A, 340B, through the rotor core 344, through a second magnet 336A, 336B, and through the stator core assembly 312A, 312B. Thus, the lower left magnet 340A has its south pole proximate to the left stator 304A and its north pole proximate to the rotor core 344 such that its magnet moment direction 364 is oriented toward the rotor core 344. The lower right magnet 340B has its south pole proximate to the right stator 304B and its north pole proximate to the rotor core 344 such that its magnet moment direction (arrow) is oriented toward the rotor core 344. The upper magnets 336A, 336B are oriented in the opposite orientation: the upper left magnet 336A has its north pole proximate to the left stator 304A and its south pole proximate to the rotor core 344 such that its magnet moment direction 360 is oriented away from the rotor core 344 and into the left stator 304A; the upper right magnet 336B has its north pole proximate to the right stator 304B and its south pole proximate to the rotor core 344 such that its magnet moment direction (arrow) is oriented away from the rotor core 344 and into the right stator 304B. This configuration of magnets 336A, 336B, 340A, 340B on the rotor core 344 create the rotor core magnetic moment 368.

The rotor core 344 can be comprised of a material with a high saturation flux density, such as alloys of cobalt, vanadium, or iron. The cross-section area of the rotor core 344 is chosen so the magnets 336A, 336B, 340A, 340B maintain saturation magnetic flux density in the rotor core 344 across the full range of coil current. The force magnitude and direction (F) is generated by the rotor core magnetic moment ($M_{Rotor}$) 368 interacting with the magnetic flux density generated by the stator assemblies ($B_{stator}$), as described by the following equation for the gradient of magnetic energy (or coenergy) with motion of the rotor:

$$\vec{F} = -\vec{\nabla}(\vec{B}_{Stator} \cdot \vec{M}_{Rotor})$$

Each stator 304A, 304B in the example embodiment shown in FIG. 3 has two coils 328A, 332A, 328B, 332B and a stator core assembly 312A, 312B. Additionally, each stator core assembly 312A, 312B can include one or more cores. In some embodiments, each stator core assembly 312A, 312B has three cores, i.e., the left stator core assembly 312A includes a first or outer core 316A, a second core 320A, and a third core 324A, and the right stator core assembly 312B includes a first or outer core 316B, a second core 320B, and a third core 324B. In the illustrated embodiment, each of the cores is U-shaped and the second core 320A, 320B and third core 324A, 324B of the stator core assemblies 312A, 312B are nested within the first or outer core 316A, 316B.

Even though the number of cores in each stator core assembly 312A, 312B may vary in different embodiments, most embodiments of the present disclosure (including the embodiments shown in FIGS. 3-6) have stator core assemblies 312A, 312B with three legs and a face at the end of each leg. Further, the legs are separated by a portion of a coil 328A, 332A, 328B, 332B. Only the faces 348, 352, 356 on the right stator 304B can be seen in FIG. 3. More specifically, the right stator 304B includes a first face 348 at the end of the core assembly's 312B first leg, where the first face 348 comprises a first face portion 372 of the second core 320B and a first face portion 368 of the first or outer core 316B. The right stator 304B also includes a second face 352 at the end of the core assembly's 312B second leg, where the second face 352 comprises a second face portion 376 of the second core 320B and a second face portion 380 of the third core 324B. The right stator 304B further includes a third face 356 at the end of the core assembly's 312B third leg, where the third face 352 comprises a third face portion 384 of the third core 324B and a third face portion 388 of the first core 316B. Each of the cores 316A, 316B, 320A, 320B, 324A, 324B can have a U-shaped or curved configuration. Moreover, it can be seen from the figures that the second 320B and third 324B cores are nested within the first or outer core 316B. The same is true for the left stator 304A, which has a first face (not shown) at the end of the core assembly's 312A first leg, where the first face comprises a first face portion of the second core 320A and a first face portion of the first or outer core 316A; a second face (not shown) at the end of the core assembly's 312A second leg, where the second face comprises a second face portion of the second core 320A and a second face portion of the third core 324A; and a third face (not shown) at the end of the core assembly's 312A third leg, where the third face comprises a third face portion of the third core 324A and a third face portion of the first core 316A. Moreover, it can be seen from the figures that the second 320A and third 324A cores are nested within the first or outer core 316A.

The faces of the core assemblies 348, 352, 356 and the faces of the coils, which are positioned proximate to and in line with the faces of the core assemblies 348, 352, 356, are machined to align with the magnets 336A, 336B, 340A, 340B and suspend the rotor core 344 between the coils 328A, 332A, 328B, 332B. Further, the air gap 400A between the left stator 304A and the rotor assembly 308 and the air gap 400B between the right stator 304B and the rotor assembly 308 can be seen in FIG. 4.

Coils 328A, 332A, 328B, 332B can be wound around at least one leg. Thus, the left stator 304A has one coil 328A positioned about the upper leg of the stator core assembly 312A and one coil 332A positioned about the lower leg of the stator core assembly 312A. The right stator has one coil 328B positioned about the upper leg of the stator core assembly 312B and one coil 332B positioned about the lower leg of the stator core assembly 312B. This configuration generates high acceleration along the vertical axis and a smaller force along the horizontal axis. Traditional steering mirrors use a spring to interconnect the mirror to the base to prevent the mirror from moving too far in the Y-direction away from the base. Thus, the mirror and the actuators are not constrained in the linear (left to right, Z-direction) direction because traditional voice coils stay centered due to the limited side (Z-direction) force. However, the actuators 300, specifically the rotor assemblies 308, of at least some embodiments of the present disclosure must be constrained in the Z-direction (left to right) because the magnets 336A, 336B, 340A, 340B are attracted to the core assemblies 312A, 312B. Thus, a U-joint or other restraining mechanism must be used in some embodiments.

FIG. 5 is a perspective view of a second embodiment of an actuator 500 and FIG. 6 is a top plan view of the actuator 500. The actuator 500 has a rotor assembly 508 with a similar geometry to the rotor assembly 308 of FIG. 3, i.e., it includes four permanent magnets 536A, 536B, 540A, 540B interconnected to a rotor core 544. In this exemplary embodiment, two magnets are located on each side of the rotor core 544 (i.e., left side and right side): upper left magnet 536A, lower left magnet 540A, upper right magnet 536B, and lower right magnet 540B. The magnets are also positioned opposite one another such that the upper right magnet 536B is opposite the upper left magnet 536A. The same is true for the lower magnets 540A, 540B. Further, the magnets 536A, 536B, 540A, 540B have consistent geometries and are symmetrical around the rotor core 544 to balance or cancel the horizontal force onto the rotor assembly 508.

The actuator 500 also comprises a left stator 504A and a right stator 504B on either side of the rotor assembly 508. Each stator 504A, 504B has a core assembly 512A, 512B and one coil 528A, 528B, instead of two coils like the stators in FIG. 3. The single coil stator 504A, 504B has the coil 528A, 528B wound around the second or center leg of the core assembly 512A, 512B, which reduces the total coil resistance as compared to embodiments with two coils, but only generates vertical force (i.e., in the Y-direction). This actuator 500 configuration generates the same vertical rotor force at the actuator 300 of FIG. 3 with half of the power as compared to embodiments with two coils, but the actuator 500 cannot apply lateral rotor force (i.e., Z-direction). Thus, if four coils are used, the actuator 300 can be selectively moved in the horizontal direction in addition to the vertical direction.

The magnets 536A, 536B, 540A, 540B are oriented to create a closed loop flux path from a magnet 540A, 540B, through the rotor core 544, through a second magnet 536A, 536B, and through the stator core 512A, 512B. Thus, the lower left magnet 540A has its south pole proximate to the left stator 504A and its north pole proximate to the rotor core 544 such that its magnet moment direction 564 is oriented toward the rotor core 544. The lower right magnet 540B has its south pole proximate to the right stator 504B and its north pole proximate to the rotor core 544 such that its magnet moment direction (arrow) is oriented toward the rotor core 544. The upper magnets 536A, 536B have the opposite orientation: the upper left magnet 536A has its north pole proximate to the left stator 504A and its south pole proximate to the rotor core 544 such that its magnet moment direction 560 is oriented away from the rotor core 544 and into the left stator 504A; the upper right magnet 536B has its north pole proximate to the right stator 504B and its south pole proximate to the rotor core 544 such that its magnet moment direction (arrow) is oriented away from the rotor core 544 and into the right stator 504B. This configuration of magnets 536A, 536B, 540A, 540B on the rotor core 544 creates the rotor core magnetic moment 568.

The rotor core 544 is comprised of a material with a high saturation flux density, such as alloys of cobalt, vanadium, or iron. The cross-section area of the rotor core 544 is chosen so the magnets 536A, 536B, 540A, 540B maintain saturation magnetic flux density in the rotor core 544 across the full range of coil current. The force magnitude and direction is generated by the rotor core magnetic moment 568 interacting with the magnetic flux density generated by the stator assemblies 504A, 504B.

Additionally, each stator core assembly 512A, 512B can include one or more cores to ensure equal cross-sectional area of the three stator legs (i.e., equal area faces). In some embodiments, each stator core assembly 512A, 512B has at least three cores, i.e., the left stator core assembly 512A includes a first or outer core 516A, a second core 520A, and a third core 524A, and the right stator core assembly 512B includes a first or outer core 516B, a second core 520B, and a third core 520B. Even though the number of cores in each stator core assembly 512A, 512B may vary in different embodiments, most embodiments of the present disclosure have stator core assemblies 512A, 512B with three legs and a face at the end of each leg. Further, the legs are separated by a portion of a coil 528A, 528B. Only the faces 548, 552, 556 on the right stator 504B can be seen in FIG. 5. More specifically, the right stator 504B includes a first face 548 at the end of the core assembly's 512B first leg, where the first face 548 comprises a first face portion 572 of the second core 520B and a first face portion 568 of the first or outer core 516B. The right stator 504B also includes a second face 552 at the end of the core assembly's 512B second leg, where the second face 552 comprises a second face portion 576 of the second core 520B and a second face portion 580 of the third core 524B. The right stator 504B further includes a third face 556 at the end of the core assembly's 512B third leg, where the third face 552 comprises a third face portion 584 of the third core 524B and a third face portion 588 of the first core 516B. Each of the cores 516A, 516B, 520A, 520B, 524A, 524B can have a U-shaped or curved configuration. Moreover, it can be seen from the figures that the second 520B and third 524B cores are nested within the first or outer core 516B. The same is true for the left stator 504A, which has a first face (not shown) at the end of the core assembly's 512A first leg, where the first face comprises a first face portion of the second core 520A and a first face portion of the first or outer core 516A; a second face (not shown) at the end of the core assembly's 512A second leg, where the second face comprises a second face portion of the second core 520A and a second face portion of the third core 524A; and a third face (not shown) at the end of the core assembly's 512A third leg, where the third face comprises a third face portion of the third core 524A and a third face portion of the first core 516A. Moreover, it can be seen from the figures that the second 520A and third 524A cores are nested within the first or outer core 516A.

The faces of the core assemblies 512A, 512B and the faces of the coils 528A, 528B, which are positioned proximate to and in line with the faces of the core assemblies 548, 552, 556, are machined to align with the magnets 536A, 536B, 540A, 540B and suspend the rotor core 544 between the coils 528A, 528B. Further, the air gap 600A between the left stator 504A and the rotor assembly 508 and the air gap 600B between the right stator 504B and the rotor assembly 508 can be seen in FIG. 6.

Figure 7:
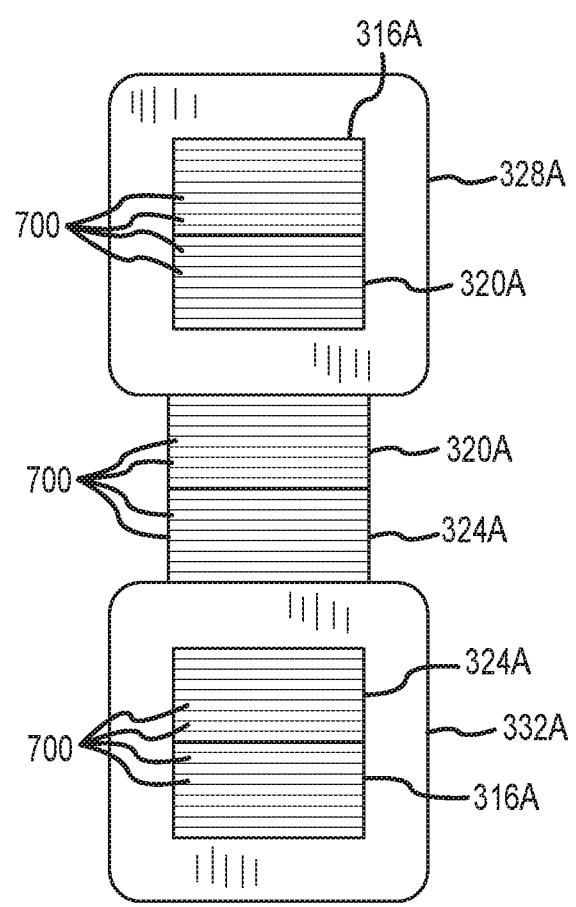
FIG. 7 is a sectional view of the actuator of FIG. 4 at section line VII-VII and specifically shows a side elevation view of the left stator.

FIG. 7 is a sectional view of the actuator of FIG. 4 taken along section line VII-VII and specifically shows a side elevation view of the left stator 312A. Various embodiments of the present disclosure include one or more laminated cores 316A, 320A, 324A comprised of layers of nanocrystalline magnetic material to increase the frequency under which the actuator can operate without large energy losses. The crystalline material has lower magnetic hysteresis losses at higher frequencies than traditional materials used in voice coils. Specifically, the nanocrystalline magnetic material does not experience much energy loss in the material until frequencies exceed 100 kHz.

At least some embodiments of the present disclosure use nanocrystalline magnetic tapes, rather than soft magnetic materials because the nanocrystalline magnetic tapes produce faster response times than the soft magnetic materials. Additionally, nanocrystalline magnetic tapes have a favorable balance between fast field response and field density saturation.

The nanocrystalline magnetic tape is wrapped to form the cores 316A, 320A, 324A such that each layer of the lamination is curved and is oriented to align with the dominant flux direction. The layers 700 of tape, as seen at the faces 348, 352, 356 are clearly visible in FIG. 7. Traditional actuators with laminated silicone steel cores have laminated layers that are perpendicular to the layers 700 shown in the embodiment of FIG. 7. Because the cores 316A, 320A, 324A, 316B, 320B, 324B are curved, the orientation of the laminated layers 700 makes the cores 316A, 320A, 324A, 316B, 320B, 324B easier to make when using the very thin nanocrystalline tape materials, maintains high permeability, and maintains low loss with flux lines aligned with nanocrystalline tape layers.

Figure 8:
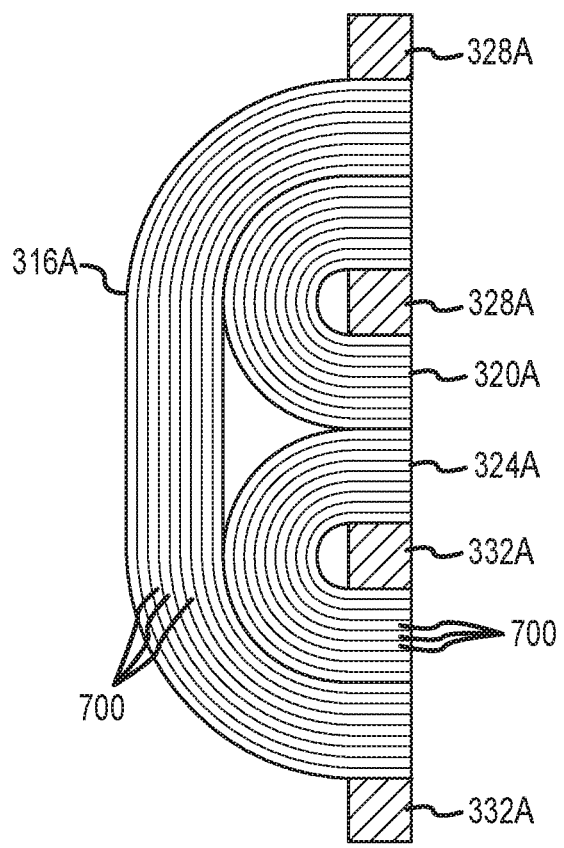
FIG. 8 is a cross-sectional view of the left stator of FIG. 3 taken through the center of the stator.

FIG. 8 is a cross-sectional view of the left stator 304A of FIG. 7 taken through the center of the left stator 304A showing the laminated cores 316A, 320A, 324A in plan view. Each of the laminated cores 316A, 320A, 324A is formed from a plurality of layers of material. The orientation of the laminate layers 700 is clearly seen in FIG. 8, i.e., each of the layers of material of each laminated core lies in a plane that is substantially perpendicular to a center point of a radius of at least a portion of a bend of the U-shape. In accordance with at least some embodiments, the cores are formed by gluing one tape layer to another tape layer and heating the layers in an oven to transform the nanocrystalline magnetic tape into a ceramic.

Although FIGS. 7 and 8 illustrate a stator 304A with two coils, it should be apparent to one of skill in the art after consideration of the present disclosure that the configuration of the cores shown in the figures can also be used in embodiments that include only one coil.

Figure 9A:
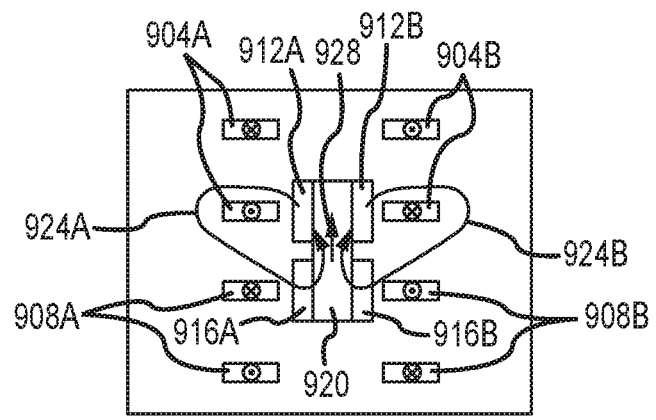
FIG. 9A depicts the current through the four coils applied to generate upward force on the rotor with the dominant flux path coupling through the upper two coils.
Figure 9B:
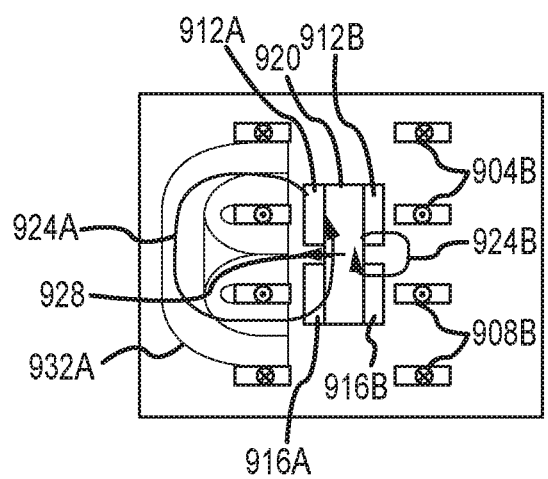
FIGS. 9B-C depict the current through the four coils to generate lateral force on the rotor with the dominant flux path through the coils on the attracting stator.
Figure 9C:
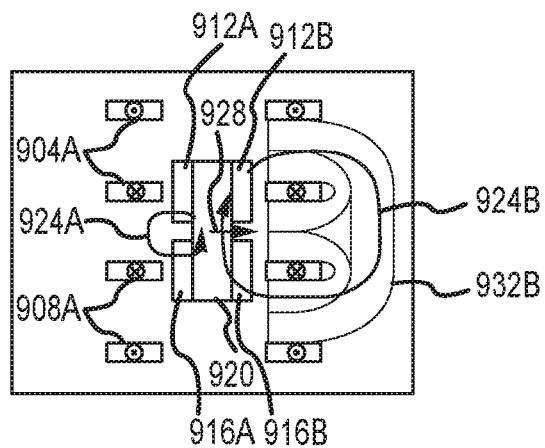

FIGS. 9A-D depict the magnetic fields produced in response to different applied currents. The plots are of a slice through the actuator showing the outlines of the rotor (rotor core 920 and magnets 912A, 912B, 916A, 916B) and the four coils 904A, 904B, 908A, 908B. FIG. 9B depicts the left stator 932A and FIG. 9C depicts the right stator 932B. The controller can drive current through the coils 904A, 904B, 908A, 908B in different directions (in or out as shown in FIGS. 9A-D) to obtain different forces and actuator movements. The coil section with a dot in a circle represents current coming out of the page, which the coil section with an X in a circle represents current going into the page. Thus, multiple degrees of freedom can be controlled. Some FSMs can have three axes of control (tip, tilt, and piston) or reaction cancellation to eliminate vibration. The coils 904A, 904B, 908A, 908B generate flux, the core directs the magnetic flux, and that flux reacts with the magnetic fields of the magnets 912A, 912B, 916A, 916B in the rotor core 920 to produce a force 928 in an upward, downward, or sideways direction.

FIG. 9A depicts the current through the four coils 904A, 904B, 908A, 908B to generate upward force 928 on the rotor 920 with the dominant flux path 924A, 924B coupling through the upper two coils 904A, 904B.

FIGS. 9B-C are coil current directions for lateral rotor force 928. The dominant flux path 924A is through the coils 904A, 908A on the attracting stator 932A in FIG. 9B and the dominant flux path 924B is through the coils 904B, 908B on the attracting stator 932B in FIG. 9C.

Figure 9D:
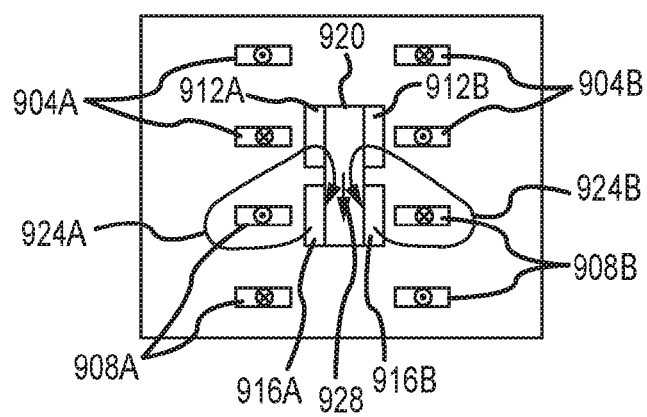
FIG. 9D depicts the current through the four coils applied to generate downward force on the rotor with the dominant flux path coupling through the lower two coils.

FIG. 9D depicts currents for downward rotor force 928 and the flux paths 924A, 924B coupling the lower two coils 908A, 908B.

Figure 10:
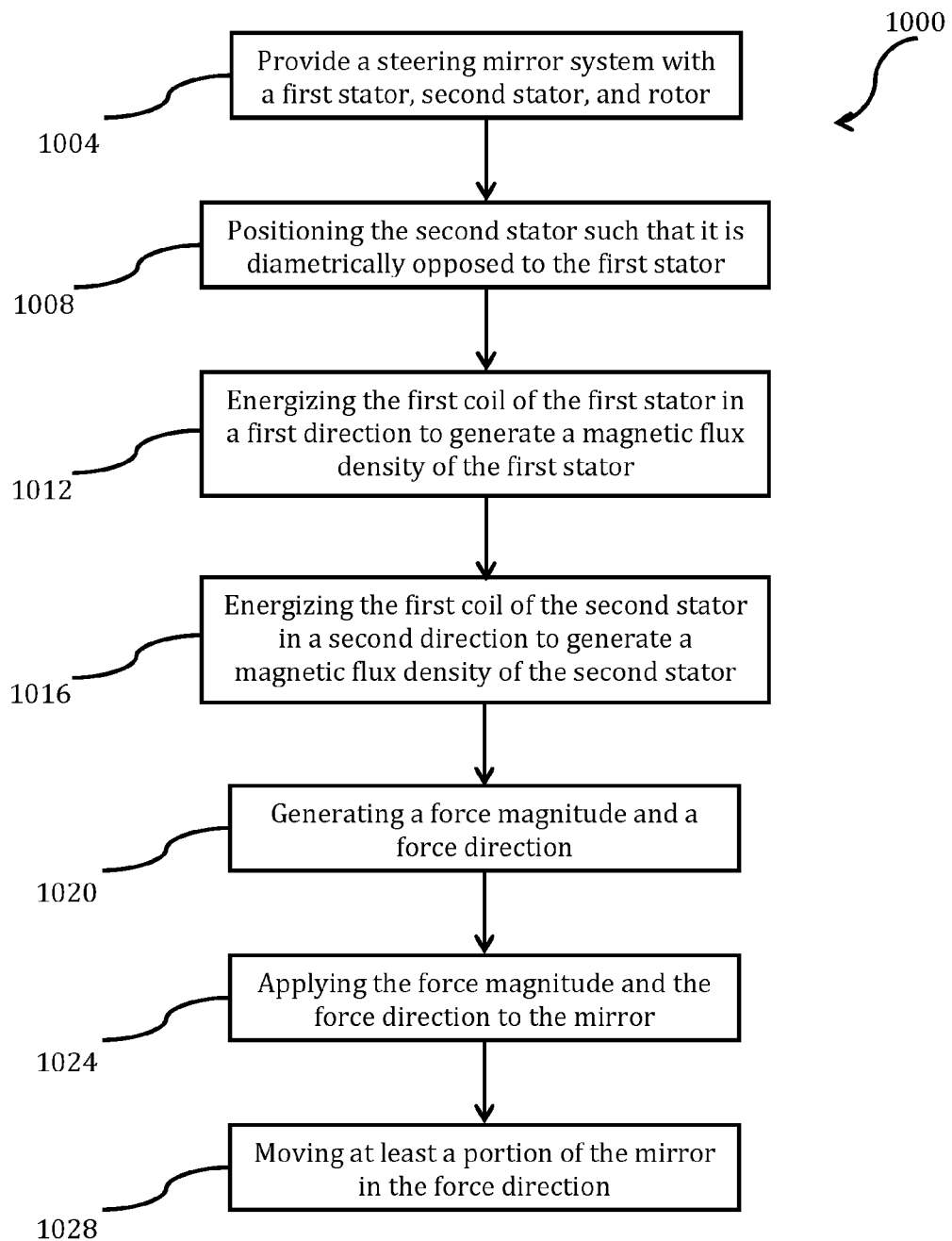
FIG. 10 is a flow chart of a method of operating a steering mirror system.

FIG. 10 is a flow chart showing a method 1000 of operating a steering mirror system. The method comprises step 1004 of providing a steering mirror system that includes a mirror, a base, and an actuator interconnected to the mirror at a first interconnection point and interconnected to the base. The method further includes providing an actuator having a rotor with a core, a first magnet and a second magnet on a first side of the rotor, and a third magnet and a fourth magnet on a second side of the rotor to generate a magnetic moment within the rotor. Next, the method comprises providing an actuator with a first stator positioned proximate to the first side of the rotor and having a core, a first coil, and at least a first leg, where the core includes a face adjacent the first magnet of the rotor, where there is a first space between the first magnet and the face, and where the first coil extends around at least the first leg. Further, the actuator includes a second stator positioned proximate to the second side of the rotor and having a core, a first coil, and at least a first leg. The core includes a face adjacent the second magnet of the rotor, there is a second space between the second magnet and the face, the first coil extends around at least the first leg. Next, step 1008 includes positioning the second stator such that it is diametrically opposed to the first stator. Thereafter, step 1012 includes energizing the first coil of the first stator in a first direction to generate a magnetic flux density of the first stator and step 1016 includes energizing the first coil of the second stator in a second direction to generate a magnetic flux density of the second stator. Step 1020 includes generating a force magnitude and a force direction via the rotor magnetic moment interacting with the magnetic flux density of the first stator and the magnetic flux density of the second stator. Step 1024 includes applying the force magnitude and the force direction to the mirror. Lastly, step 1028 includes moving at least a portion of the mirror in the force direction. In some embodiments, the method further includes positioning the first stator proximate to a center of the base and positioning the second stator proximate to an outer perimeter of the base, and positioning the first stator farther away from the rotor than the second stator relative to the rotor such that the first space is larger than the second space.

Embodiments of the present disclosure also include a method of forming an actuator. The method comprises the steps of forming a first core by wrapping a first laminate layer around a mandrel to achieve the desired core shape, such as a flattened toroid. Then layer a first laminate layer on a second laminate layer and continue laying the layers until the desired core thickness is reached with means to hold the layers in position, such as bonding material between each layer. Form a second core using the same construction method and having the same dimensions as the first core. Interconnect the two cores with a means such as bonding or an adhesive. Form the third core by wrapping a first laminate layer around the first two cores in the desired shape. Then layer a first laminate layer on a second laminate layer and continue laying the layers until the desired core thickness is achieved with means to hold the layers in position, such as bonding material between each layer. Once all of the cores are shaped and formed, interconnect the three laminated cores together to create a first core assembly. Anneal the core assembly before or after assembling the laminated layers to achieve the desired magnetic properties. Cut the layered core assembly into a pair of core assemblies with the desired number of legs. Machine or grind the two core assemblies to achieve the desired length of the six legs and shape of the six faces. Interconnect at least one coil to at least one leg of the first core assembly to create the first stator. Interconnect at least one coil to at least one leg of the second core assembly to create the second stator. Next interconnect four magnets to a rotor core using shims and glue to create the rotor with precisely positioned magnets. Interconnect the rotor assembly to the mirror. Then position the rotor between the first and second core assemblies such that the machined faces of the first core assembly are positioned proximate to two magnets on a first side of the rotor and the machined faces of the second core assembly are positioned proximate to the other two magnets on the second side of the rotor, and such that the horizontal centerlines of both stators and the horizontal centerline the rotor are aligned with a vector pointing to the point about which the mirror rotates.

The mirror 116 may, as examples but without limitations, range in size from about an inch in length or diameter (depending on the shape of the mirror 116) to about a meter in diameter or length. Further, the mirror can be comprised of fiber reinforced polymer composites and conductive sensor target plates secured to another in some embodiments. The mirror 116 may be ovular or circular, as shown in FIG. 1, or the mirror 116 may be rectangular, triangular, or any other shape in other embodiments. Custom coatings for the mirror can be used and include gold, silver, and dielectrics. In one embodiment, the mirror optical surface has a surface power error of less than 0.5 waves PV at 633 nm. In some embodiments, the mirror optical surface has a surface irregularity less than 0.25 waves PV at 633 nm. In one embodiment, the mirror optical surface has a surface roughness less than 60 Angstroms RMS. In various embodiments, the mirror optical surface has a reflectivity greater than 90% at 633 nm.

In some embodiments, and when required if the gimbal includes position sensors, the gimbals can have coupled optics, coupled electromagnetic sensors, caging mechanisms, and redundant electronics. Typical gimbals used with FSMs have the following performance characteristics: large field-of-regard coverage, high-accuracy pointing, large payload capacity, position accuracy to <5 µrad, payload capacity to >2,000 lb, and structural stiffness to >100 Hz. In one embodiment, the gimbals are the Risley Optical Gimbal System. The Risley gimbal offers a compact solution to two-axis optical pointing through the use of rotating prism wedges.

Control of the mirror's position may be performed by a processor or controller implementing a control algorithm that receives input from mirror position sensors and pointing instructions from other on-board sensors, a control authority, and/or other sources. Moreover, the controller can control the delivery of power signals to the actuators of the mirror assembly in response to the mirror sensor inputs and instructions.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:
1. A steering mirror system, comprising:
a mirror;
a base; and
an actuator interconnected to the base and the mirror, the actuator including:

a rotor, including: a rotor core, wherein the rotor core is curved; a first magnet on a first side of the rotor core; and a second magnet on a second side of the rotor core;

a first stator positioned proximate to the first side of the rotor, the first stator including: a core assembly; a coil; and at least a first leg; wherein the core assembly includes a first core and a face adjacent the first magnet of the rotor, wherein there is a first space between the first magnet and the face, and wherein the coil extends around the first leg; and a second stator positioned proximate to the second side of the rotor, the second stator including: a core assembly, a coil, at least a first leg, wherein the core assembly includes a first core and a face adjacent the second magnet of the rotor, wherein there is a second space between the second magnet and the face, wherein the coil extends around the first leg, wherein the second stator is diametrically opposed to the first stator, wherein the first stator is positioned on a side of the rotor proximate to a center of the base, and wherein the first space between the first magnet and the face of the core assembly of the first stator is larger than the second space between the second magnet and the face of the core assembly of the second stator.

2. The steering mirror system of claim 1, wherein the core assembly of the first stator further includes a second face and a third face adjacent the rotor, and wherein the core assembly of the second stator includes a second face and a third face adjacent the rotor.

3. The steering mirror system of claim 1, wherein the rotor further includes a third magnet on the first side of the rotor and a fourth magnet on the second side of the rotor.

4. The steering mirror system of claim 3, wherein the core assembly of the first stator includes a second face adjacent the first magnet and the third magnet and a third face adjacent the third magnet, and wherein the core assembly of the second stator includes a second face adjacent the second magnet and the fourth magnet and a third face adjacent the fourth magnet.

5. The steering mirror system of claim 1, further comprising a gimbal assembly interconnected at a first end to the mirror and at a second end to the base.

6. The steering mirror system of claim 1, wherein the actuator is a first actuator, the system further comprising:

a second actuator interconnected to the base and the mirror, the second actuator including:

a rotor, including: a rotor core; a first magnet on a first side of the rotor core; and a second magnet on a second side of the rotor core;

a first stator positioned proximate to the first side of the rotor, the first stator including: a core assembly; a coil; and at least a first leg, wherein the core assembly includes a first core and a face adjacent the first magnet of the rotor, wherein there is a first space between the first magnet and the face, and wherein the coil extends around the first leg; and a second stator positioned proximate to the second side of the rotor, the second stator including: a core assembly; a coil; and at least a first leg, wherein the core assembly includes a first core and a face adjacent the second magnet of the rotor, wherein there is a second space between the second magnet and the face, wherein the coil extends around the first leg, and wherein the second stator is diametrically opposed to the first stator.

7. The steering mirror system of claim 6, wherein the rotor core of the second actuator is curved.

8. A method of operating a steering mirror system, comprising:

providing a steering mirror system including:

a mirror;

an assembly base; and an actuator interconnected to the mirror at a first interconnection point and to the assembly base, the actuator including:

a rotor with a core, a first magnet and a second magnet on a first side of the rotor, and a third magnet and a fourth magnet on a second side of the rotor to generate a magnetic moment within the rotor;

a first stator positioned proximate to the first side of the rotor and proximate to a center of the assembly base, the first stator having a core, a first coil, and at least a first leg, wherein the core includes a face adjacent the first magnet of the rotor, wherein there is a first space between the first magnet and the face, and wherein the first coil extends around the first leg; and a second stator positioned proximate to the second side of the rotor and proximate to an outer perimeter of the assembly base, the second stator having a core, a first coil, and at least a first leg, wherein the core includes a face adjacent the third magnet of the rotor, wherein there is a second space between the third magnet and the face, wherein the first coil extends around the first leg, wherein the second stator is diametrically opposed to the first stator, and wherein the first stator is positioned farther away from the rotor than the second stator relative to the rotor such that the first space is larger than the second space;

energizing the first coil of the first stator in a first direction to generate a magnetic flux density of the first stator;

energizing the first coil of the second stator in a second direction to generate a magnetic flux density of the second stator;

generating a force magnitude and a force direction via the rotor magnetic moment interacting with the magnetic flux density of the first stator and the magnetic flux density of the second stator;

applying the force magnitude and the force direction to the mirror; and moving at least a portion of the mirror in the force direction.

9. The method of operating a steering mirror system of claim 8, wherein the rotor core is curved.

* * * * *